United States Patent [19]

Dibrell et al.

[11] Patent Number: 4,482,379

[45] Date of Patent: Nov. 13, 1984

[54] COLD SET CEMENT COMPOSITION AND METHOD

[75] Inventors: Benton L. Dibrell, Laurel, Miss.; Richard G. Gandy, Grand Prairie, Tex.

[73] Assignee: Hughes Tool Company, Houston, Tex.

[21] Appl. No.: 538,647

[22] Filed: Oct. 3, 1983

[51] Int. Cl.$^3$ .......................... C04B 7/35; C04B 7/353
[52] U.S. Cl. ........................................ 106/76; 106/77; 106/78; 106/81; 106/93
[58] Field of Search ................. 106/76, 77, 78, 81, 106/93; 166/293

[56] References Cited

U.S. PATENT DOCUMENTS 3,891,454 6/1975 Cunningham et al. ............... 106/89
3,937,282 2/1976 Shryock et al. ...................... 166/293
4,054,461 10/1977 Martin ................................... 106/89

FOREIGN PATENT DOCUMENTS 1064058 9/1979 Canada .................................. 261/50

*Primary Examiner*—James Poer
*Attorney, Agent, or Firm*—Robert A. Felsman; Charles D. Gunter, Jr.

[57] ABSTRACT

A cement composition is shown for use in preparing a pumpable slurry capable of setting and developing compressive strength at low temperatures. The cement composition includes a hydraulic cement, gypsum, calcium chloride and a setting time retarding agent. The cement composition also includes an additive blend comprising sodium metasilicate, lime and hydroxyethyl cellulose. The cement slurries of the invention are prepared by adding mixing water to the dry cement composition in an amount ranging from about 8 to about 13 gallons of water per 89 pounds of dry cement composition.

12 Claims, No Drawings

COLD SET CEMENT COMPOSITION AND METHOD

BACKGROUND OF THE INVENTION

The present invention relates generally to cement compositions useful for cementing in low temperature environments and, specifically, to a dry cement composition for use in preparing a pumpable slurry for cementing pipe in wells drilled through low temperature earth formations.

In Artic regions, the surface temperature is so cold that underlying formations often do not reach 32° F. for several hundred feet. These regions are termed "permafrost" regions meaning any permanently frozen subsurface formation. The frozen section may exist from a few feet to depths of 1500 feet or more. Permafrost varies from about 10% to as much as 90% ice and temperatures typically range from 8° F. to about 15° F. at depths of 25 to 100 feet. Cementing well conductor pipe and surface pipe in permafrost regions presents special problems. A cement slurry that bonds pipe to ice must fulfill a number of requirements before a good primary cementing job can be successfully completed. A neat Portland cement will not set up and provide strength in permafrost regions before it freezes.

One technique which has been used to combat this problem in hardrock areas involves heating the hole with warm drilling mud, then cementing with heated cement and heated mixing water. The heating delays freezing of the cement until after it has set up. This method cannot be used, however, when drilling through unconsolidated formations held together by ice because the hole will enlarge and create a void between the cement and formation. An acceptable permafrost cement must provide a low heat of hydration to reduce the enlargement of the hole due to melting of the ice formation. The slurry must develop a set product instead of freezing of temperatures of about 15° F. to 32° F. The slurry must, therefore, provide adequate compressive strength for supporting casing and provide good bonding to the ice formation. The slurry must also provide an adequate pumping time with a reasonable viscosity to allow placement of a uniform sheath of cement thick enough to minimize further thawing.

Gypsum-Portland cement blends have been used in the past to cement permafrost regions which blends typically contain a dispersant, a retarder and a freezing point dispersant. The preferred freezing point depressants used in the past were monovalent chloride salts with the preferred salt being sodium chloride, although potassium chloride was used at times. The freezing point depressant operated to lower the freezing point of the water used to form the cement slurry so that it would not freeze during mixing and curing of the cement.

It has now been discovered that a cement composition can be provided for use in cementing permafrost formations which utilize a divalent chloride salt and which has superior cementing properties.

It has also been discovered that a high yield slurry can be provided which allows the use of a high water concentration and provides a low slurry density which will develop adequate compressive strength at temperatures in the range of about 15°–20° F. without freezing. The system allows use of unheated mixing water and can be used with calcium aluminate cements.

SUMMARY OF THE INVENTION

The cement composition of the invention includes a hydraulic cement, gypsum, a divalent chloride salt, and a setting time retarding agent. A special additive blend is also present in the cement composition which blend comprises sodium metasilicate, lime, and hydroxyethyl-cellulose. Water is added to the cement composition in an amount ranging from about 8 to about 13 gallons per 89 pounds of dry solids. The cement composition can also optionally include a lost circulation material and a dispersant.

In the process of cementing pipe in a well which penetrates a low temperature earth formation, a cement slurry as previously described is deposited into the space between the pipe and the formation and allowed to set. The slurry comprises a hydraulic cement, gypsum, a divalent chloride salt, a setting time retarding agent, and an additive blend comprising sodium metasilicate, lime, and hydroxyethyl-cellulose. Water is mixed with the dry solids in an amount effective to form a pumpable slurry capable of setting and developing adequate compressive strength at low temperatures.

Additional objects, features and advantages will be apparent in the written description which follows.

DETAILED DESCRIPTION OF THE INVENTION

The cement compositions of the present invention include a hydraulic cement, gypsum, a divalent chloride salt, a setting time retarding agent, and an additive blend comprising sodium metasilicate, lime, and hydroxyethyl-cellulose. Optionally, the cement composition can contain a lost circulation additive and a dispersant.

Any of a wide variety of commercially available hydraulic cements can be used in producing the composition of this invention. The American Society for Testing Materials has established a classification for Portland cements and of those, Classes I, II, III, IV or V are useful in the present invention. The American Petroleum Institute has also established a classification for Portland cements. Of those cements, API Classes, A, B, C, G, or H are useful in the present invention. High alumina cements including calcium aluminate cements can also be used in the practice of the present invention. The preferred hydraulic cement is a Portland cement such as an API Class G cement.

The components of the cement composition of the present invention will sometimes be referred to as parts of a "sack" of dry solid materials. Each sack of solids, which comprises all the elements of the present invention except water, weighs about 89 pounds and occupies about one cubic foot of space. The word "sack" as used hereinafter shall mean an 89 pound sack of dry solids.

The hydraulic cement should be present in the cement compositions of the invention in a concentration of from about 15 pounds to about 35 pounds per sack. Concentrations of cement lower than about 15 pounds per sack do not provide sufficient compressive strength as the cement cures. Concentrations of cement in the composition of greater than about 35 pounds per sack do not given adequate early strengths during the curing time just after the cement has been placed in the wall bore. Preferably, the hydraulic cement is present in the cement composition of the invention in an amount of about 27 pounds per sack.

The gypsum, also referred to as gypsum cement, can be any commercially available ground calcium sulfate hemihydrate. The gypsum should be present in the cement composition of the invention in the range from about 150% to 220% based on the weight of cement or about 40.5 pounds to 59.4 pounds per sack, and most preferably is present in an amount of about 163% based on the weight of hydraulic cement which is equal to approximately 44.0 pounds of gypsum per sack.

A variety of setting time retarders are available for use in carrying out the invention. Alkali or alkaline earth salts of citric acid are useful setting time retarders with the most preferred being sodium citrate. The anhydrous salt is preferred and is supplied as a dry powder for inclusion in the cement composition. Sodium citrate is preferably present in the cement composition of the invention in the range from about 0.1 to 0.5 percent based on the weight of cement or about 0.027 pounds to 0.135 pounds per sack, with the most preferred amount being about 0.13 pounds per sack.

Lignosulfonate retarders are also useful as setting time retarders with the present invention. Typical commercially available lignosulfonate retarders include alkali metal, alkaline earth metal or alkali metal-alkaline earth metal salts of lignosulfonic acid. Water soluble lignosulfonates which are useful retarders include calcium lignosulfonate, ferro lignosulfonate, potassium lignosulfonate, ferro chrome lignosulfonate, ammonium lignosulfonate and lithium lignosulfonate. Lignosulfonic acid can also be used, and mixtures of the salts of lignosulfonate with each other and with lignosulfonic acid can be used. The lignosulfonate retarder is preferably present in the range from about 0.1 to 2.0 percent based on the weight of cement or about 0.27 to 0.54 pounds per sack.

A divalent chloride salt is preferred as the freezing point depressant. The preferred freezing point depressant is calcium chloride. Finely ground anhydrous calcium chloride is preferably used in the dry blended compositions of the invention. Calcium chloride is preferably present in the range from about 4 to 15 percent based on the weight of water or about 3.51 to 13.16 pounds per sack, most preferably about 12 percent based on the weight of water which is about 10.54 pounds of calcium chloride per sack of dry solids. The freezing point depressant acts to lower the freezing point of the water used to form the cement slurry so that it will not freeze during mixing and curing of the cement. Prior teaching has been that the monovalent chloride salts were preferred since the divalent chloride salts were thought to have too great a heat of hydration when mixed with water. It has now been found that the use of calcium chloride as a freezing point depressant in the present cement compositions provides an instant heat of hydration which decreases during the time immediately following mixing. As a result, the present cement slurries can be prepared without using heated water and will develop adequate compressive strength at temperatures in the range of 15°-20° F. without freezing.

The cement compositions of the present invention also include an additive blend which comprises sodium metasilicate, lime and hydroxyethyl cellulose. Sodium metasilicate is commercially available in a dry powder form and is preferably present in the range from about 3 to 25% based on the weight of hydraulic cement or about 0.81 to 6.75 pounds per sack with the preferred range being about 10 to 20% based on the weight of hydraulic cement, or about 2.70 to 5.40 pounds per sack with the most preferred amount being about 15% by weight of hydraulic cement which is equal to about 4.05 pounds per sack.

The lime component of the additive blend is present in the range from about 2 to 15% based on the weight of cement or about 0.54 to 4.05 pounds per sack, most preferably about 5% by weight of cement which is equal to about 1.35 pounds per sack.

The hydroxyethyl cellulose component of the additive blend is present in the range from about 0.3 to 1.5% based on the weight of cement or about 0.081 to 0.405 pounds per sack, most preferably about 1% by weight of cement which is equal to about 0.27 pounds per sack.

A lost circulation additive can be optionally added to the cement composition. The lost circulation additive is used to prevent the cement slurry from escaping into porous zones in the subterranean formations through which the well bore passes. Typical lost circulation additives include gilsonite, walnut hulls and cellophane flakes, with the preferred material being gilsonite. The gilsonite is preferably present, if at all, in the range from about 0 to 15% by weight of hydraulic cement, most preferably about 10.2% by weight of cement which is equal to about 2.75 pounds per sack.

The cement composition of the invention can also optionally include a dispersant type material. Dispersants, also called densifiers, are commercially available for use in oil well cementing and are generally the sodium salts of naphthalene-sulfonic acid condensed with formaldehyde and can contain additives such as polyvinylpyrrolidone. The dispersant, if present, is preferably used in the range from about 0 to 2% based on the weight of cement with the most preferred amount being about 1.2% based on the weight of cement or about 0.32 pounds per sack.

The cement composition of the present invention is prepared by mixing the dry solids which have been enumerated together in any sequence and then adding mixing water to the dry solids. The lost circulation additive, if used, is added either before or during the addition of water to the other dry solids. Preferably, water can be added to the dry solids in an amount ranging from about 8 to 13 gallons per sack, most preferably in an amount from about 10 to 12 gallons per sack to produce a slurry having a density which preferably ranges from about 11.0 to 13.5 pounds per gallon. The slurries of the present invention have an excellent yield which is on the order of 1.92 cubic feet per sack.

The low temperature oil well cementing compositions are used by pumping the slurry of dry solids and water into the annular space between the well casing and the well bore and allowing the slurry to cure into a set cementitious compound.

The following examples are intended to illustrate some of the desirable properties of the cement slurries of the invention and of the set cement produced therefrom and are not intended to limit the scope of the invention.

A basic slurry mixture used in the test runs which follow was prepared containing the dry components in the concentrations indicated in Table I:

TABLE I

| Component | Amount |
| --- | --- |
| Class G Cement | 26.64 lbs. |
| Gypsum | 43.40 lbs. |
| Calcium Chloride | 10.54 lbs. |

TABLE I-continued

| Component | Amount |
| --- | --- |
| Gilsonite | 2.71 lbs. |
| Sodium Citrate | 0.13 lbs. |
| Sodium Metasilicate | 4.00 lbs. |
| Lime | 1.33 lbs. |
| Hydroxyethyl Cellulose | 0.27 lbs. |

The dry components in Table 1 were blended together to form one sack of the cement composition of the invention weighing approximately 89 lbs. A cement slurry was then prepared using approximately 10.53 gallons of water per 89 pound sack of dry cement composition. The yield of the slurry was 1.92 cubic feet per sack of cement composition and the slurry had a density of 12.2 pounds per gallon or 92.01 pounds per cubic foot.

The heat of hydration of the slurry as determined using calorimeter testing methods at 40° F. was 11.8 calories per kilogram of slurry and at 80° F. was 16.9 calories per kilogram of slurry. The thermal conductivity of the slurry at 40° F. was 0.116 BTU/(hr ft °F.). The thermal conductivity at 80° F. was 0.146 BTU/(hr ft °F.).

The effect of various concentrations of sodium citrate setting time retarder on the thickening times of the cement slurries of the invention is shown in Table II. The thickening time tests were performed in accordance with recommended API practice.

TABLE II (Thickening Times)

| Sodium Citrate Retarder (pounds per sack) | Consistency (Hr:Min to 70 Bc) | | | |
| --- | --- | --- | --- | --- |
| | 20 F | 40 F | 80 F | 100 F |
| — | 3:18 | 2:47 | 1:15 | 1:08 |
| 0.05 | 4:45 | 4:35 | 2:25 | 1:29 |
| 0.09 | 7:15 | 8:00+ | 2:40 | 1:59 |
| 0.15 | 8:00+ | 8:00+ | 3:04 | 2:30 |

The compressive strengths of the cement slurries of the invention were then determined at variouis retarder concentrations and are shown in Tables III and IV.

TABLE III

| Sodium Citrate Retarder (pounds per sack) | 24-Hour Compressive Strength | | | |
| --- | --- | --- | --- | --- |
| | 20 F | 40 F | 80 F | 100 F |
| — | 20 | 25 | 135 | 160 |
| 0.05 | 16 | 26 | 128 | 150 |
| 0.09 | 16 | 26 | 123 | 150 |
| 0.15 | 13 | 5 | 105 | 135 |

TABLE IV (Long Term Compressive Strength)

| Sodium Citrate Retarder (pounds per sack) | 20F | | | 40F | | | 80F | | |
| --- | --- | --- | --- | --- | --- | --- | --- | --- | --- |
| | 1 Day | 7 Day | 14 Day | 1 Day | 7 Day | 14 Day | 1 Day | 7 Day | 14 Day |
| 0.09 | 16 | 73 | — | 26 | 55 | 65 | 128 | 185 | 235 |

An invention has been provided with significant advantages. The cement compositions of the invention produce high yield slurries having low densities which are capable of setting and developing adequate compressive strength at low temperatures without freezing. The combined reaction of sodium metasilicate, lime, hydroxyethyl cellulose and calcium chloride allows the use of a high mixing water ratio and provides a low slurry density that will develop adequate compressive strength at temperatures of 20° F. without freezing. The system allows the use of unheated mixing water and has a heat of hydration which is quickly dissipated and does not unduly melt the ice surrounding the well bore. The system can also be used with calcium aluminate cements. The high mixing water ratio produces a low cost, high yield, low density cement system for cementing in low temperature environments.

While the invention has been shown in only one of its forms, it is not thus limited but is susceptible to various changes and modifications without departing from the spirit thereof.

We claim:

1. A cement composition made up of dry solids for use in preparing a pumpable slurry capable of setting and developing compressive strength at low temperatures, comprising:

a hydraulic cement, gypsum, a divalent chloride salt, and a setting time retarding agent; and an additive blend comprising lime, sodium metasilicate, and hydroxyethyl cellulose.

2. The composition of claim 1 having water added thereto in an amount ranging from about 10 to about 12 gallons per 89 pounds of dry solids.

3. The composition of claim 2 wherein said hydraulic cement is selected from the group consisting of Portland cements and calcium aluminate cements.

4. The composition of claim 3, wherein said divalent chloride salt in calcium chloride and said setting time retarding agent is selected from the group consisting of sodium citrate retarder and lignosulfonate retarder.

5. The composition of claim 4 having added thereto a lost circulation additive in an amount ranging from about 0.1 to 5 pounds per 89 pounds of dry solids.

6. The composition of claim 5 having added thereto a dispersant in an amount ranging from about 0.1 to 1 pounds per 89 pounds of dry solids.

7. The composition of claim 6, wherein said hydraulic cement is present in said composition in the amount of about 27 pounds per 89 pounds of dry solids, wherein said gypsum is present in said composition in the amount of about 44 pounds per 89 pounds of dry solids, wherein said calcium chloride salt is present in said composition in the amount of about 11 pounds per 89 pounds of dry solids, and wherein said setting time retarding agent is present in said composition in the amount of about 0.13 pounds per 89 pounds of dry solids.

8. The composition of claim 7, wherein said water is added in the amount of about 10.5 gallons per 89 pounds of dry solids.

9. A process for cementing pipe in a well which penetrates a low temperature earth formation comprising the steps of depositing in the space between said pipe and said formation an aqueous slurry of a cement composition and thereafter allowing said slurry to set, wherein said slurry comprises:

a hydraulic cement, gypsum, a divalent chloride salt, and a setting time retarding agent;

an additive blend comprising lime, sodium metasilicate and hydroxyethyl cellulose; and water in an amount to form a pumpable slurry capable of setting and developing adequate compressive strength at low temperatures.

10. The process of claim 9, wherein said water is added to said cement composition in an amount ranging from about 10 to 12 gallons per 89 pounds of dry solids.

11. A process of preparing a pumpable cement slurry for cementing pipe in wells drilled through low temperature earth formations, comprising the steps of:

mixing together in water a blend of hydraulic cement, gypsum, a divalent chloride salt, a setting time retarding agent, lime, sodium metasilicate and hydroxyethyl cellulose; and said water being added in an amount to form a pumpable slurry capable of setting and developing compressive strength at low temperatures.

12. The process of claim 11, wherein said water is added to said blend in an amount ranging from about 10 to about 11 gallons per 89 pounds of dry solids.

* * * * *

UNITED STATES PATENT OFFICE
CERTIFICATE OF CORRECTION

Patent No. 4,482,379    Dated  November 13, 1984

Inventor(s)  Benton L. Dibrell, et al.

It is certified that error appears in the above-identified patent and that said Letters Patent are hereby corrected as shown below:

At column 1, line 50, change "dispersant" to read "depressant".

[SEAL]

Signed and Sealed this

Twenty-third Day of April 1985

Attest:

DONALD J. QUIGG

Attesting Officer    Acting Commissioner of Patents and Trademarks